United States Patent
Li et al.

(10) Patent No.: US 11,544,354 B2
(45) Date of Patent: Jan. 3, 2023

(54) SYSTEM FOR SECURE PROVISIONING AND ENFORCEMENT OF SYSTEM-ON-CHIP (SOC) FEATURES

(71) Applicant: Avago Technologies International Sales Pte. Limited, Singapore (SG)

(72) Inventors: Yong Li, San Diego, CA (US); Sherman (Xuemin) Chen, San Diego, CA (US); Abbas Saadat, Quebec (CA); Fabian Russo, Irvine, CA (US); Dexter Bayani, Irvine, CA (US); Brett Tischler, San Diego, CA (US); Bryant Tan, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 1043 days.

(21) Appl. No.: 15/914,652

(22) Filed: Mar. 7, 2018

(65) Prior Publication Data
US 2019/0278886 A1    Sep. 12, 2019

(51) Int. Cl.
*G06F 21/10* (2013.01)
*G06F 21/57* (2013.01)
*G06F 21/76* (2013.01)
*G06F 21/62* (2013.01)
*H04L 9/40* (2022.01)

(52) U.S. Cl.
CPC ........... *G06F 21/105* (2013.01); *G06F 21/57* (2013.01); *G06F 21/629* (2013.01); *G06F 21/76* (2013.01); *H04L 63/0428* (2013.01); *H04L 63/06* (2013.01)

(58) Field of Classification Search
None
See application file for complete search history.

(56) References Cited

U.S. PATENT DOCUMENTS

2017/0041793 A1*  2/2017  Lee .................. H04L 41/082

OTHER PUBLICATIONS

ICT Monitor Worldwide, Intel Releases New Technology Specification for Memory Encryption, Dec. 27, 2017 (Year: 2017).*

* cited by examiner

*Primary Examiner* — John W Hayes
*Assistant Examiner* — Ari Shahabi
(74) *Attorney, Agent, or Firm* — BakerHostetler

(57) ABSTRACT

A system and method are disclosed for provisioning IP features in a system-on-chip. A plurality of identical chips are fabricated, each of which is capable of have a number of features enabled or disabled. As a default, all features are disabled. A production process is later carried out, in which the chip is installed in a greater device. During this process, the manufacturer requests a license the IP owner for enablement of various features. Using secure communications, a license is granted identifying the features to be enabled, and a volume of units permitted to be manufactured. The license information is encrypted using a key already known to the chip, and sent to the manufacturer. The chip receives the license information during provisioning, extracts relevant provisioning information using the key, and a secure processing system provisions the relevant features. Log information is generated to allow the IP owner to verify license compliance.

19 Claims, 7 Drawing Sheets

SYSTEM FOR SECURE PROVISIONING AND ENFORCEMENT OF SYSTEM-ON-CHIP (SOC) FEATURES

BACKGROUND

Field

The disclosure relates to a system and a method for provisioning features of a system-on-chip (SoC).

Background

An IP owner that seeks to have a chip designed and/or manufactured to meet its specifications, will often request that the chip be capable of performing a large number of features. However, for each specific customer, a small subset of the available features on a given chip may actually be authorized for use. Traditionally, provisioning the authorized features was handled by the chip being designed and fabricated to include all possible features. Then, during the actual manufacturing process of a particular chip, a read-only memory was programmed with the features that were being made available to the customer, which caused those features to unlock. Features that were not identified in the memory were kept in a locked state and were unusable by the customer.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
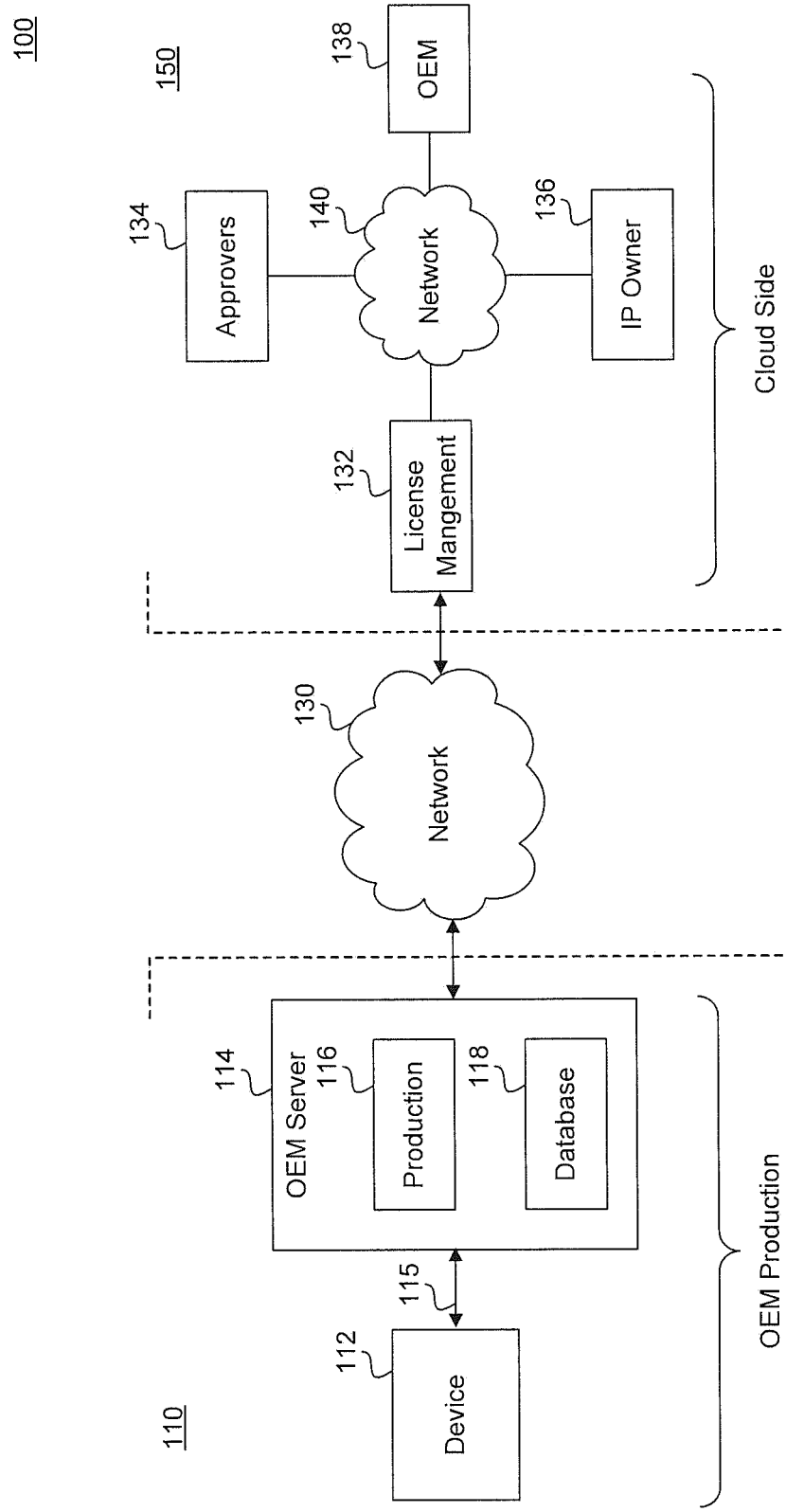
FIG. 1 illustrates a block diagram of an exemplary provisioning environment according to an embodiment of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," and the like, indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, and the like), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, and the like. Further, any of the implementation variations may be carried out by a general purpose computer, as described below.

For purposes of this discussion, any reference to the term "module" shall be understood to include at least one of software, firmware, or hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Previous implementations for provisioning features in a chip required a device manufacturer to receive a list of unlocked features from the IP owner, and to program a memory within the device to specifically identify the unlocked features. Consequently, each device had to be custom-manufactured for each customer. As a result, the responsibility to enforce the IP owner's licensing agreements was indirectly placed on the device manufacturer, and there was no reliable means of verification or enforcement.

In light of the above, there is a need for a provisioning system that can be implemented by the IP owner, and which can allow for verification and/or tracking of licenses to ensure compliance with the licensing agreements.

Provisioning Environment

FIG. 1 illustrates a block diagram of an exemplary provisioning environment 100 according to an embodiment of the present disclosure. The environment 100 includes a production side 110 and a cloud side 150. The cloud side 150 of the environment 100 is responsible for managing production licenses, including obtaining approval and authorizing such licenses. The cloud side 150 is also responsible for providing compliance monitoring to IP owners. Across a network 130, the production side 110 of the environment 100 is responsible for carrying out the provisioning and device production, as well as reporting production results and license uses. These and other aspects of the disclosure will be disclosed in further detail below.

The production side 110 and cloud side 150 are separated from each other by a network 130. The network 130 is presumed to be neither persistent nor trustworthy, such as for example the Internet. The cloud side 150 of the environment includes license management server 132, approvers 134, the original end manufacturer (OEM) 138 and the IP (intellectual property) owner 136. The IP owner 136 is the licensor in the provisioning process. The IP owner 136 owns the rights to the technology, features and/or the services (hereinafter collectively referred to as "features") that are to be licensed to an end user or an OEM. The OEM 138 is the manufacturer of the final device that includes the system-on-chip having the IP Owner features. The OEM 138 may request use of the IP owner's technology for personal use, or may be mass producing devices that use the technology for sale to customers, clients, etc.

The approvers 134 are responsible for managing the license management server 132. There are two types of approvers: the IP owner and a custodian at the company that has entered the agreement with the IP Owner.

A typical production transaction, for purposes of this discussion, involves three main parties: the chip maker, the IP owner, and the OEM. As discussed above, the IP owner owns the intellectual property rights to the technology being placed in the chip. The chip maker fabricates the chips to specification provided by the IP owner, which will later be placed into a production device (e.g., a set-top box). The OEM manufactures the final production device (herein also referred to as "device"), which includes the chip fabricated by the chip maker. In an embodiment, a chip maker, like Broadcom Corp, often receives requests from IP owners to manufacture chips that include a large number of optional features. These features are constructed on the chip through hardware, software, or firmware, but are identified in the chip memory as a list. This list, otherwise referred to as a feature bank, includes the enabled or disabled states of those features. As a default, all optional features are disabled, but are capable of being later enabled by an authorized OEM during device production. On the cloud side 150, the OEM 138 transmits a feature request to the IP Owner 136 via the network 140. The feature request includes sufficient information to identify the OEM and the features requested. For example, in an embodiment, the feature request includes a unique identifier associated with the OEM 138 and a listing of requested features to be authorized. In an embodiment, the feature request may also include a volume request that indicates the number of licenses requested.

Upon receiving the feature request, the IP owner 136 reviews and authorizes/denies the request using the information provided in the request. There may be a number of reasons why a request is denied, including that the unique identifier is missing or unidentified, that the volume does not match stored records, or that no valid license agreement exists for the OEM 138 associated with the request. If, on the other hand, the request is valid and accurate, then the IP owner 136 authorizes the request. The authorization is carried out by the IP Owner 136 forwarding a response signal via the network 140 to the OEM 138 and to the license management server 132. In an embodiment, the response signal includes the same license information as was included in the initial request signal in order to notify the License Management server 132 of the information necessary to authorize the OEM 138 at the production side 110 of the environment 100.

Accordingly, upon receiving the response signal, the license management server 132 generates an IP license contract file, and forwards the license contract file to the production side 110 of the environment 100. In an embodiment, the license contract file is a cryptographically-binding IP license contract file that includes, among other information, an encrypted configuration payload that encodes the IP enablement information (e.g., the information used by the production side to carry out device production), a date code range that specifies a period of validity of the license, and a number of licenses granted. Within the license contract file, the validity dates may be identified in terms of time codes, which specify the permitted production period and the period that the license features are valid (e.g., feature subscription period). The license contract file may also include additional information, such as a production site code, which identifies the authorization location that the device is permitted to be provisioned, as well as operation configurations that identify the allowed operation modes.

The production side 110 includes an OEM server 114 and the device to be manufactured 112, also referred to as the Customer Premises Equipment (CPE). The OEM server 114 includes the production software 116 and a database 118. The OEM server 114 receives the license contract file via the network 130, and prepares the license information for implementation on the device 112. A Trusted Application (TA) running within a Trusted Execution Environment (TEE) carries out the provisioning within the device 112. The TA and the TEE will be discussed in further detail below with respect to FIG. 4.

The OEM server 114 stores the licensing information in the database 116 in encrypted format. The OEM server 114 then builds a configuration data block that contains the encrypted configuration payload and the date code range from the license contract file. The configuration payload remains encrypted throughout this process. As a result, the OEM server 114 is not privy to the contents of the configuration payload (e.g., the configuration payload is transparent to the OEM server 114). The OEM server 114 then communicates with the device 112 over the connection 115. It is presumed that the connection 115 is persistent during the entire provisioning process.

The OEM server 114 encrypts and packages the configuration data block within a provisioning message, and sends the provisioning message to the trusted application running on the device 112. The provisioning message may include provisioning information for a plurality of IP owners. In that scenario, a separate configuration data block is included within the provisioning message for each IP owner.

The trusted application running within the TEE of the device 112 processes the configuration data and performs validation (discussed in detail below) on all the received configuration data blocks included within the provisioning message. The TEE then securely activates or deactivates IP features according to the provisioned information in the configuration payload. The trusted application encrypts the configuration data blocks using system-on-chip hardware and a non-volatile memory key and provides the encrypted data to the software running on the device 112 for storage. The trusted application then produces a log on the enabled IP license and encrypts the log to be cryptographically-binding, and sends the log back to OEM server 114 for forwarding to the license management server 132 for compliance checks.

License management server 132 decrypts and stores the log data for tracking and compliance purposes. The OEM 138 is responsible for uploading the log file to the license management server 132 periodically based on IP Owner 136 requirements. If connected to the cloud, the OEM server 114 can automatically report back to the license management server 132.

The above constitutes an overview of the operation of the exemplary disclosure, and is expanded in further detail below with respect to individual discussion of the license management server 132, OEM server 114, and the device 112.

License Management Server

Figure 2:
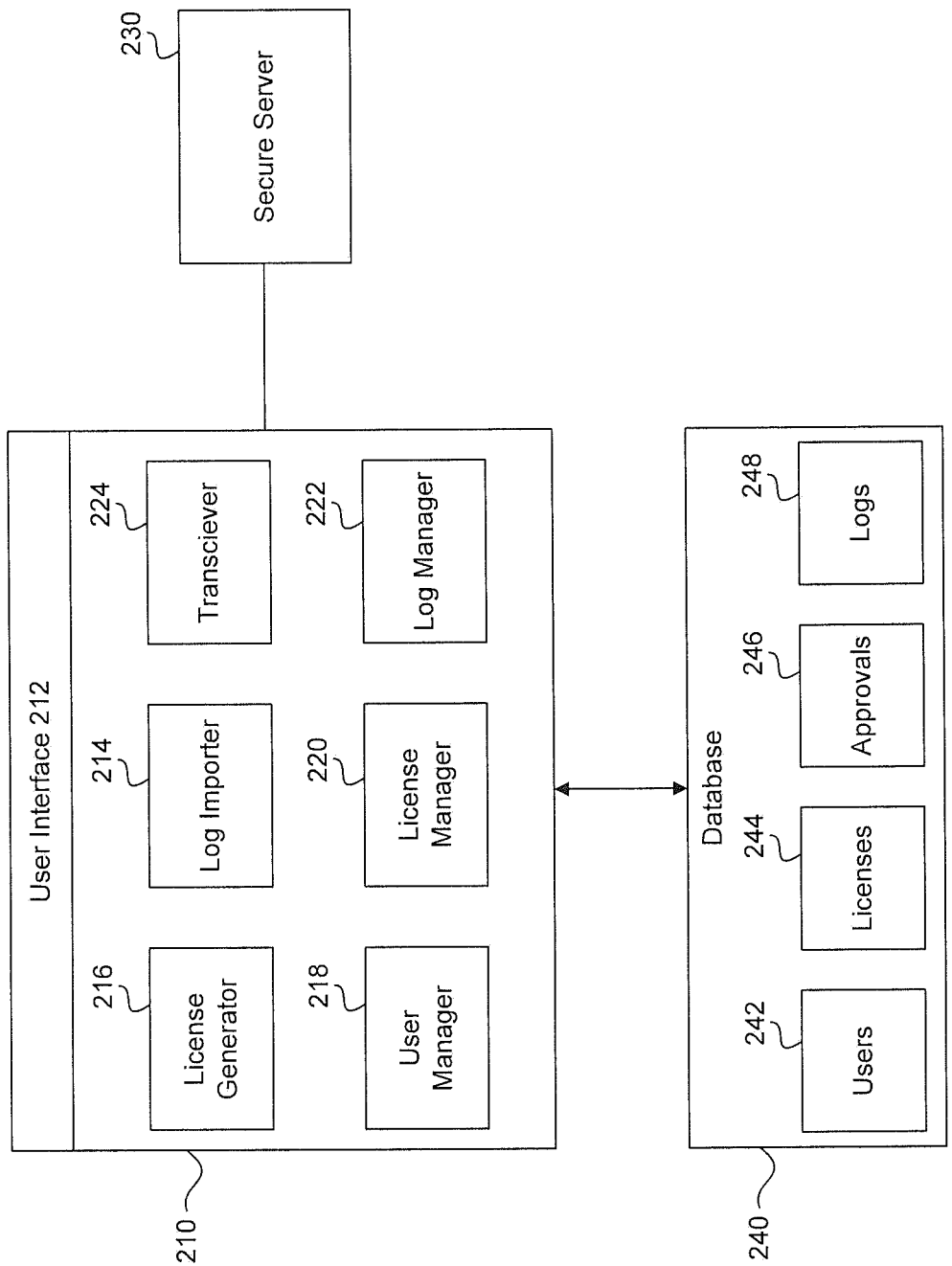
FIG. 2 illustrates a block diagram of an exemplary license management system according to an embodiment of the disclosure.

FIG. 2 illustrates a block diagram of an exemplary license management server 200 according to an embodiment of the disclosure. The license management server 200 includes a processing portion 210 and a database portion 240. The processing portion 210 includes a user interface 212, log importer 214, license generator 216, user manager 218, license manager 220, log manager 222 and transceiver 224. The license management server 200 represents an exemplary embodiment of license management server 132.

Primary purposes of the license management server 200 are to host the license management software for purposes of processing authorized licenses, and cataloging log data from the OEM server 114 for review and compliance verification. In order to support these functions, the license management server 200 includes data storage sufficient in size both for the software's operation as well as for data backup. Additionally, the license management server 200 have the necessary security provisions to support the software's security elements. Specifically, the system 200 has access to a secure server 230 that handles the security processing associated with the license management. In an embodiment, the secure server 230 is a Hardware Secure Module (HSM).

As shown in FIG. 2, a user interface 212 allows users to interact with the system and the software running thereon. This interaction allows approvers to review and approve/deny licenses, etc. As discussed above, the license management server 200 receives request authorizations from approvers 134 via the user interface 212. Using the user interface 212, the approver is able to associate the authorization with certain parameters and/or restrictions, as discussed below in further detail. Using this information associated with the authorization, a license generator 216 creates the license contract file that will be forwarded to the OEM server 114 in the production side 110 to allow for device production to commence.

A user manager 218 tracks the users permitted to access the system and to approve/deny license requests. A license manager 220 maintains the various licenses that have been authorized and/or denied. In embodiments, the license manager 220 tracks the licenses that were issued, the applicable date range associated with those licenses, and the volume of units authorized by those licenses. A log importer 214 receives log data from the OEM server 114 detailing provisions that have taken place. Such logs may include number of units provisioned, dates of provisioning, features enabled, etc. A log manager 222 compiles and updates the logs based on the received log information. The license manager 220 reviews the logs against corresponding license data to ensure compliance and continued validity. For example, the license manager 220 accesses the license in order to determine the parameters and restricted associated therewith. Then, the license manager 220 retrieves the logs associated with the license. The logs include a variety of information related to the provisioning that occurred, such as date of provisioning, features enabled, etc. By comparing the details in the logs to the parameters/restrictions in the license, the license manager 220 can assess whether the provisioning has been carried out within the bounds of the license, or whether the license has been violated.

The license management server 200 has access to a database 240, in which information relating to user 242, licenses 244, approvals 246, and logs 248 are stored. This data can be retrieved for use by any of the components of the license management server 200, updated, and reloaded into the database 240 for future use. For example, upon receiving new log information relating to a particular license, log manager 222 retrieves previous log data from the logs 248 within the database 240. The log manager 222 updates the log information and stores the newly-updated information in the database 240. The license manager 220 then retrieves the relevant license from licenses 244 of the database 240 and the updated log information stored in the logs 248 of the database 240. As discussed above, the license manager 220 checks the log data against the license information for compliance or other purposes. Other components may access, update and store data in the database for additional purposes.

OEM Server

Figure 3:
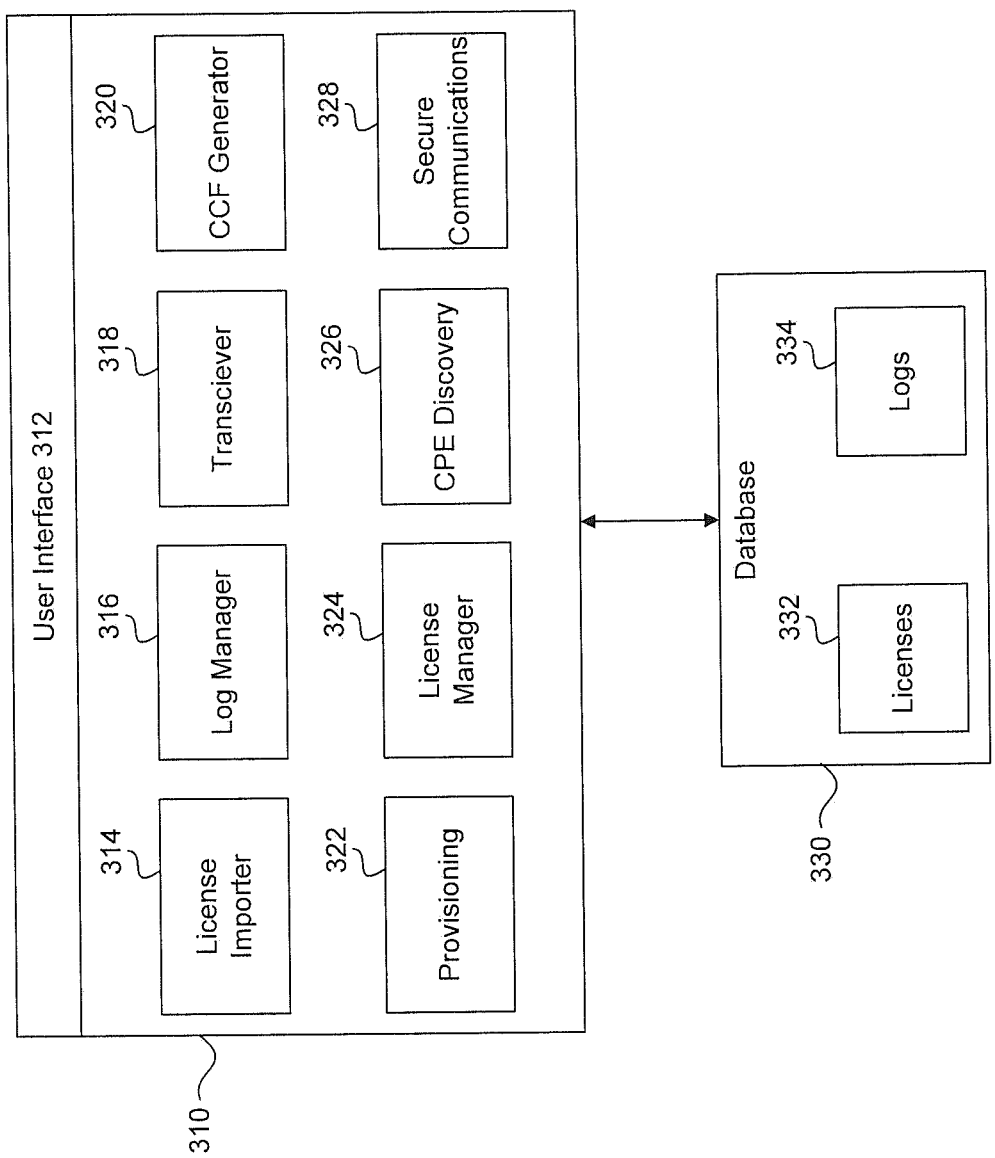
FIG. 3 illustrates a block diagram of an OEM server that supports the provisioning environment.

FIG. 3 illustrates a block diagram of an OEM server 300. The OEM server 300 includes a processing portion 310 and a database portion 330, and represents an embodiment of the OEM server 114.

Within the processing portion 310, the OEM server includes license importer 314, log manager 316, user interface 312, configuration container file (CCF) generator), provisioning 322, license manager 324, customer premises discovery 326, and secure communications 328. The processing portion 310 is in communication with the database 330. The database 330 stores a variety of data useful in the provisioning process, including at least licenses 332 and logs 334.

The OEM server 300 is located at the OEM production facility and is managed by the OEM 138. The primary function of the OEM server 300 is to host the production software, which carries out the provisioning protocol and interface with the device 112. As with the license management server 200, the OEM server 300 should have access to sufficient storage to support the software's operation as well as data backup. Additionally, the OEM server 300 should have the necessary security provisions to support the software's security elements.

The components shown in the processing portion 310 of the OEM server carry out the functions of the software. For example, the production software implements two primary functions: enforcing license policies during production via license verification (discussed in detail below); and provisioning the IP enablement during the device production via a secure provisioning procedure (discussed in detail below).

Several of the components of the OEM server 300 perform functions similar to those of the license management system 200. For example, the OEM server 300 is accessible by the OEM 138, and the UI 312 provides the interface for allowing the OEM 138 access. A log manager 316 logs provisioning data. For example, the log manager 316 updates logs with newly-provisioned device information, such as date/time of provisioning, features provisioned, corresponding license associated with the features provisioned, etc., and stores the logs in the database 330 as logs 334. The license importer 314 and license manager 324 work together to receive, monitor and verify licenses from the license management system 200. Received licenses are stored in the database 330 as licenses 332.

The provisioning 322 performs license analysis and authorizes the provisioning of certain features described in the licenses. The CCF generator 320 creates a configuration container file (CCF) that includes a listing of features to be enabled and certain authorization information. The CCF will be forwarded to the device 112 via a secure communication channel 115. As a result, in an embodiment, the CCF is not encrypted or otherwise secured because the channel 115 is secure. The device 112 enables the listed features in response to the receipt of the CCF.

CPE discovery 326 detects a device undergoing production, and specifically detects the type of device for purposes of identifying a corresponding license. Once the device is discovered and identified, a proper license can be obtained and reviewed from the database 330. Based on the information contained within the license, provisioning 322 and CCF generator 320 generate the provisioning information to be sent to the device for enabling various features. Secure communications 328 manages the transmitting and receiving of data between the device 112 and the license management system 200.

In the OEM server 300, several of the components that communicate with outside devices, such as the license importer, etc., are supported in their communication functions by a transceiver 318. The transceiver 318 may configured to communicate either wirelessly or over a wired connection, and is capable of both receiver and/or transmitting data.

Device

Figure 4:
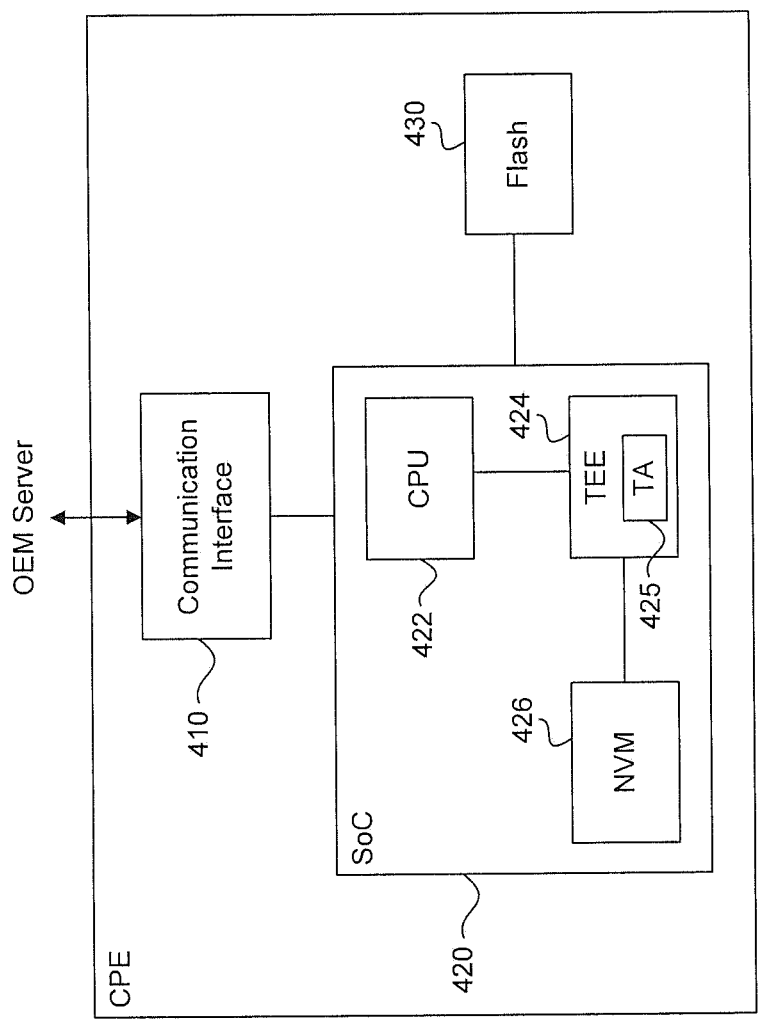
FIG. 4 illustrates a block diagram of device (customer premises equipment—CPE) according to an exemplary embodiment of the disclosure.

FIG. 4 illustrates a block diagram of device 400 (customer premises equipment—CPE) according to an exemplary embodiment of the disclosure. The device 400 includes a system-on-chip 420, and represents an exemplary embodiment of device 112.

The device 400 includes a communication interface 410 that sends and receives data between the OEM server 300 and the system-on-chip 420. During the provisioning process, the communication interface 410 may find the IP address of the OEM server 300 through either configuration or discovery. As discussed above, it is presumed that the communication line between the device 400 and the OEM server 300 is secure. As such, in an embodiment, the communication interface 410 does not have encryption or other security capabilities. In embodiments, the network interface 410 may communicate via Ethernet, Multimedia over Coax Alliance (MoCA), Universal Serial Bus (USB), Universal Asynchronous Receiver-Transmitter (UART), etc.

The system-on-chip 420 includes a CPU 422, a trusted execution environment (TEE) 424 and non-volatile memory (NVM) 426, and is connected with flash memory 430. A host provisioning application (HPA) runs on the CPU 422. The HPA receives the initial provisioning request from the OEM server 300 and sends a request to the trusted application operating on the TEE to start the provisioning process. The CPU 422 is the host CPU of the device and is involved not only in the provisioning process, but also in the general chip functioning. The configuration control file received from the OEM server 300 is stored in the flash memory 430. During provisioning, the TEE 424 handles all security-related tasks as well as the feature enablement based on the CCF. These, and other features are discussed in further detail below.

The TEE 424 is used for security purposes. For example, the TEE is a secure virtual computing environment running on the SoC 420 that protects sensitive code and data. Typically, the TEE runs alongside a rich (untrusted) execution environment (REE). A TEE can be created in a variety of different ways. For example, there can be dedicated secure processing in which the TEE is running on a separate secure processor. Alternatively, a TrustZone can be provided, which is a CPU specific hardware and software implementation that virtualizes two CPU contexts: a "normal" world, and a "secure" world. Additionally, the TEE can be virtualized by using a hypervisor to segment a system into TEE and REE virtualized contexts. Within the TEE, the trusted application (TA) 425 operates to carry out the provisioning instructions authorized by the OEM server 300 as discussed above. As their names imply, the trusted execution environment and the trusted application are secure.

The Provisioning Process

Figure 5:
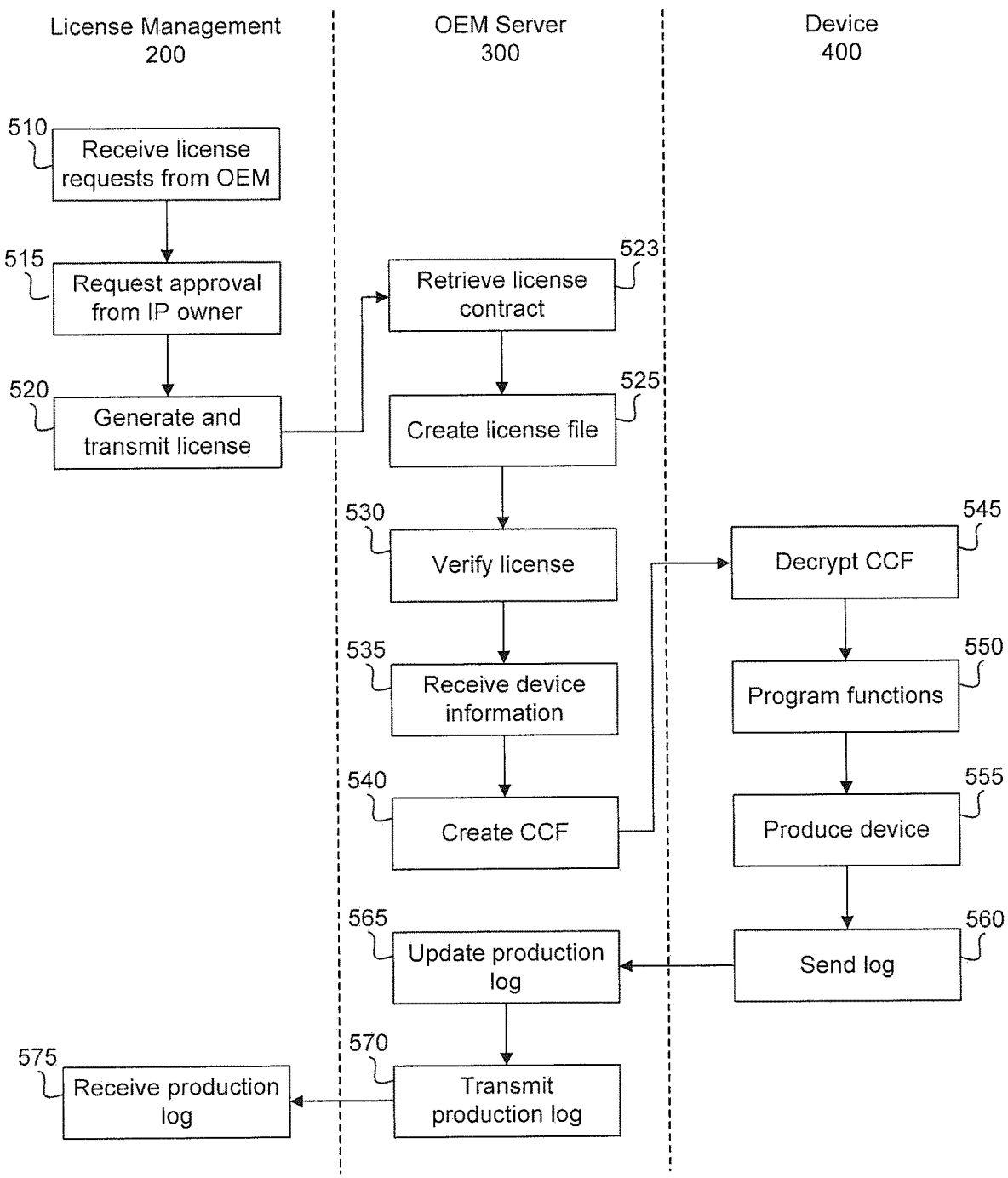
FIG. 5 illustrates a flowchart diagram of a method for provisioning features in a device.

FIG. 5 illustrates a flowchart diagram of a method 500 for provisioning features in a device. The method 500 is carried out primarily by the license management server 200, the OEM server 300, and the device 400, described above with respect to FIGS. 2-4, respectively. The description of the method 500 is provided below with reference to the earlier drawings.

License Request/Approval

Initially, the OEM 138 sends a request (510) for an IP license to the license management server 132. The request includes all information necessary to identify the OEM and the parameters requested. For example, the request may include an identifier associated with the OEM 138, the IP features requested, a volume of units to be authorized, an identifier of the IP owner 136, etc.

Upon receipt of the request, the license management system 132 sends a notification signal to the IP owner 136 identified in the request, or associated with the IP features, as to the request, seeking approval thereof (515). This notification may be via secure mail or other secure messaging format. In response, the IP owner 136 logs into the license management system 132/200 via the user interface 212. There, the IP owner 136 is able to review and approve, deny, or modify the request. In embodiments, the IP owner 136 can also add comments, such as a valid date range that defines a validity period of time for the approved license. The license manager 220 of the license management server 200 stores the license, updated or not, and the IP Owner responses in its database 240. In the license, the validity dates identified by the IP owner can be included as time codes or date codes, which specify the permitted production period and the period that the licensed features are valid (e.g., feature subscription period).

After the license has been approved, the license generator 216 generates the license contract (520). The license contract includes the licensing information necessary to carry out provisioning at the OEM production side 110, as well as logging, etc. Such information includes the configuration payload, the valid date range, the OEM and IP Owner identifications, a production server ID and a digital digest of the information contained in the license contract. The configuration payload specifies the license terms, including the IP feature list and the request/approval timestamps. Once generated, the secure server 230 encrypts at least the configuration payload, and then forwards the license contract to the OEM server 114 via the network 130. In an embodiment, the OEM 138 is responsible for accessing the license management server 132 and downloading the license contract (523). This may be in response to a notification received from the license management server 132.

License Verification

After OEM server 300 receives the license contract, the license manager 324 constructs a license file (525) from the license contract. The license file is used to enforce the IP Owner 136 licenses during production. The license file contains much of the same data as provided in the license contract, except stripped down to that data necessary for overseeing provisioning, such as enabled features, units authorized, valid date range, etc. The license file also includes a field to track the number of units already produced and/or a number of units remaining to be produced. In embodiments, in order to protect against tampering, replay, cloning or other security breaches, the license file is encrypted.

Prior to beginning the provisioning procedure with the device, the license manager 324 verifies the license file (530). This verification process may involve a number of different checks. For example, the license manager 324 checks that the parameters in the license file are still applicable. These checks include determining that the current date is within the specified valid date range, determining that the number of units has not been met, etc.

The verification of the license file may also include a check with the license management server 200 in order to confirm that the license is valid. For example, duplicated use of the license (e.g., cloning) can be evidenced from repeated provisioning requests. In order to prevent cloning, the OEM server 300 institutes a beaconing mechanism with the license management server 200. Specifically, the OEM server 300 periodically sends a beacon message to the license management server 200 and waits for an acknowledgement. If the beaconing fails (e.g., response timed out) for a predetermined number of times, then the OEM server 300 halts provisioning until beaconing succeeds. In an embodiment, the beaconing signal includes the OEM server identification, the current license usage (including the original license file and the number of used licensed instances [e.g., number of production units having the licensed IP feature(s)]), and the production line identification. Notably, in addition to being carried out prior to production, verification with the license management server 200 may also occur at any point thereafter during production.

After the license has been verified (530), provisioning commences.

Provisioning

Once the license file has been verified (530), the OEM server 300 begins exchanging information (535) with the device 400 for initiating provisioning. As part of this exchange, the OEM server 300 transmits a provisioning request to the device 400. In response, the Host Provisioning Application (HPA) running on the CPU 422 of the device 400 sends a provisioning request to the TEE 424 by creating a secure session token with the trusted application operating within the TEE 424. The HPA then also reads the unique chip ID from the SoC 420 that is currently being produced/configured. The HPA then responds to the request from the OEM server 300. This response signal includes the secure session token and the unique chip ID.

The information included in the response signal allows the OEM server 300 to identify all applicable licenses. Once identified, the CCF generator 320 creates a configuration container file (CCF) (540) that includes a configuration data block for each applicable license. Each configuration data block includes the corresponding license contract (including the encrypted configuration payload) and some chip-specification information, such as chip ID and license sequence number. The OEM server 300 then forwards the CCF to the HPA operating on the device 400.

As discussed above, each configuration payload in the CCF is encrypted by the license management system 200, and the OEM server 300 does not have the key necessary to decrypt this information. Consequently, the content of the configuration payloads remain invisible to the OEM server 300.

The device 400 receives the CCF via the communication interface 410, and forwards the CCF to the TEE 424 for processing. The trusted application operating on the TEE 424 is pre-programmed with the decryption key for the configuration payloads included in the CCF. Thus, upon receipt of the CCF, the trusted application decrypts each of the configuration payloads (545). After each of the configuration payloads have been decrypted, the trusted application re-encrypts the CCF along with the unique chip ID and the TEE-specific key, and also generates a log file that is encrypted with the session encryption key. The log file includes information about the licenses provisioned for each IP Owner 136 and their features which are enabled in the device 112. Each IP Owner section in the log is separately encrypted using the IP Owner secret key that can only be processed by the license management system 132. Information contained in the log file includes unique chip ID, license contract, license sequence number, etc. This information is directly copied from the configuration data block received from the OEM server 300 during provisioning. The trusted application in the TEE 424 also generates a digital signal of the log data. The trusted application then forwards both the re-encrypted CCF and the encrypted log file to the HPA operating on the CPU 422.

The HPA installs the encrypted CCF file into the flash memory 430, which causes the provisioned features to be enabled (545). Specifically, as discussed above, the chip is already outfitted with all available features. However, those features remain in a default disabled state until the provisioning occurs. The installation of the CCF file into the flash memory 430 causes registers relating to the provisioned features to be flipped, thereby identifying the provisioned features as enabled. In an embodiment, the flash 430 is a hard-disk drive or other suitable non-flash memory. Once the features have been enabled, final device production can conclude (555). After the HPA programs the flash 430 with the CCF, the HPA forwards the encrypted log (560) file to the production system 116 at the OEM server 300.

The license manager 316 within the OEM server 300 decrypts the log with the session encryption key and stores the log (565) in the database 330. The log manager 316 also marks the SoC as "provisioned" so as to prevent illegitimate re-provisioning. Periodically, upon request, or after completion of the provisioning process, the OEM server 300 sends the log file (570) to the license management system 200. The specific times at which the log file is sent depends upon the requirements associated with each IP owner 136. Log reporting parameters can be received along with the original license contract, and stored in the database in association with the received license, or in association with the corresponding IP Owner for future reference.

The method 500 concludes with the license management server 200 receiving the log file (575) from the OEM server 300. Once at the license management server 200, the IP owners 136 are permitted to access, review and analyze the log files for compliance with licenses, etc. Additionally, as discussed above, the license management server 200 can perform certain automated compliance checks.

Through the above method steps, described with respect to the various components illustrated in FIGS. 1-4, a secure method for provisioning features within a system-on-chip is provided. The method allows for IP owners to protect their intellectual property in a safe and secure manner, without burdening the chip manufacturer with manufacturing chips to different specifications for each customer.

After the provisioning process is complete, the device saves the multi-dimensional binding information from the licensing contract in its non-volatile memory (e.g., flash). This information, includes the time codes, production site codes, and operation configurations, among other information.

Field Provisioning

Whereas the secure provisioning process described above is carried out in a device production facility, in other embodiments, provisioning can also be performed in the field—after device production. In such embodiments, device features can be enabled or disabled in the field, allowing for dynamic provisioning. The system for field provisioning as modified from the facility provisioning system, is described below.

Figure 6:
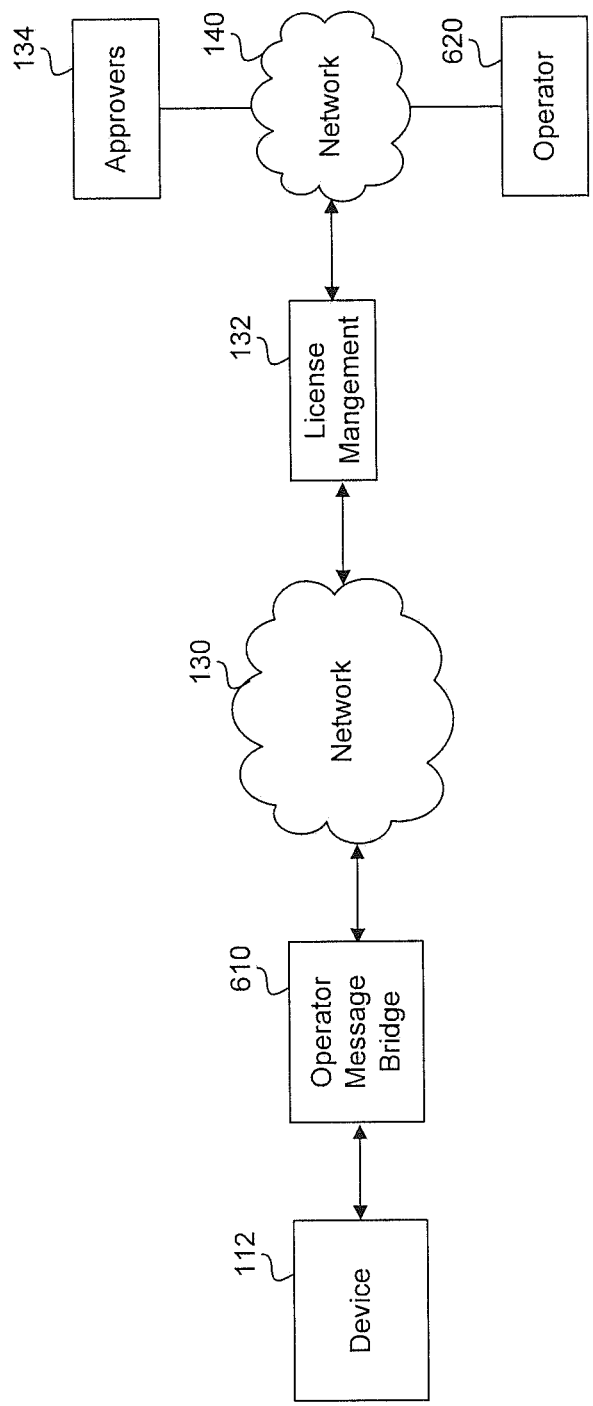
FIG. 6 illustrates a block diagram of an exemplary field provisioning environment according to an embodiment of the present disclosure.

FIG. 6 illustrates a field provisioning environment 600 according to an exemplary embodiment of the disclosure. The environment 600 is similar to facility provisioning environment 100, and elements that remain unchanged from FIG. 1 maintain their original numerical designations. New elements are given new designations.

In the non-field configuration, the CCF is generated by the OEM server 114. However, in field provisioning, the license management system 132 generates the CCF and encapsulates within a provisioning message appropriate for the means of communication being implemented. For example, if the field provisioning takes place over an Internet protocol, then the provisioning message is sent as IP data. For MPEG, the message is sent via a carousel approach, etc. The encapsulation wrapper includes an appropriate destination address that identifies the field device.

In this configuration, the host application operating on the CPU 422 of the device 112 receives and identifies the provisioning message, and extracts the CCF file from the transport. As with the facility-based configuration, the host application saves the CCF file in the flash memory 430 (or other suitable memory). The trusted application running in the TEE 424 carries out the IP feature enablement based on the stored CCF file upon initialization of the device 112. This is carried out substantially in the same manner as in the facility-based configuration.

However, because the device 112 does not have the benefit of the OEM server 114, the license management server 132 provides the device 112 with in-field provisioning tools. These tools include a secure communication protocol with the TEE 424, IP license enforcement, secure generation of configuration data, and secure collection of log data. More specifically, the in-field provisioning tools carry out steps 535-560, as described above with respect to FIG. 5. At the end of provisioning, the device 112 generates the log data and forwards the same to the license management server 132.

In an embodiment, an operator message bridge 610 is provided between the device 112 and the license management server 132 in order to facilitate message exchange therebetween. For example, operator message bridge 610 performs necessary message format adaptation between the Internet backhaul 130 and the access transport of the operator network 140. The operator message bridge 610 bridges the reformatted messages between these two sides. In order to support the in-field provisioning, the access transport between the operator message bridge 610 and the device 112 is persistent. The backhaul connection between the operator message bridge 610 and the license management system 132 is also persistent.

In another embodiment, a persistent end-to-end Internet protocol connection exists between the device 112 and the license management server 132. In this embodiment, the operator message bridge 610 is not needed, and is thus excluded from the environment 600. In this embodiment, scheduling of the in-field provisioning is directly controlled by the license management system 132, or is initiated by the device 112.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 7:
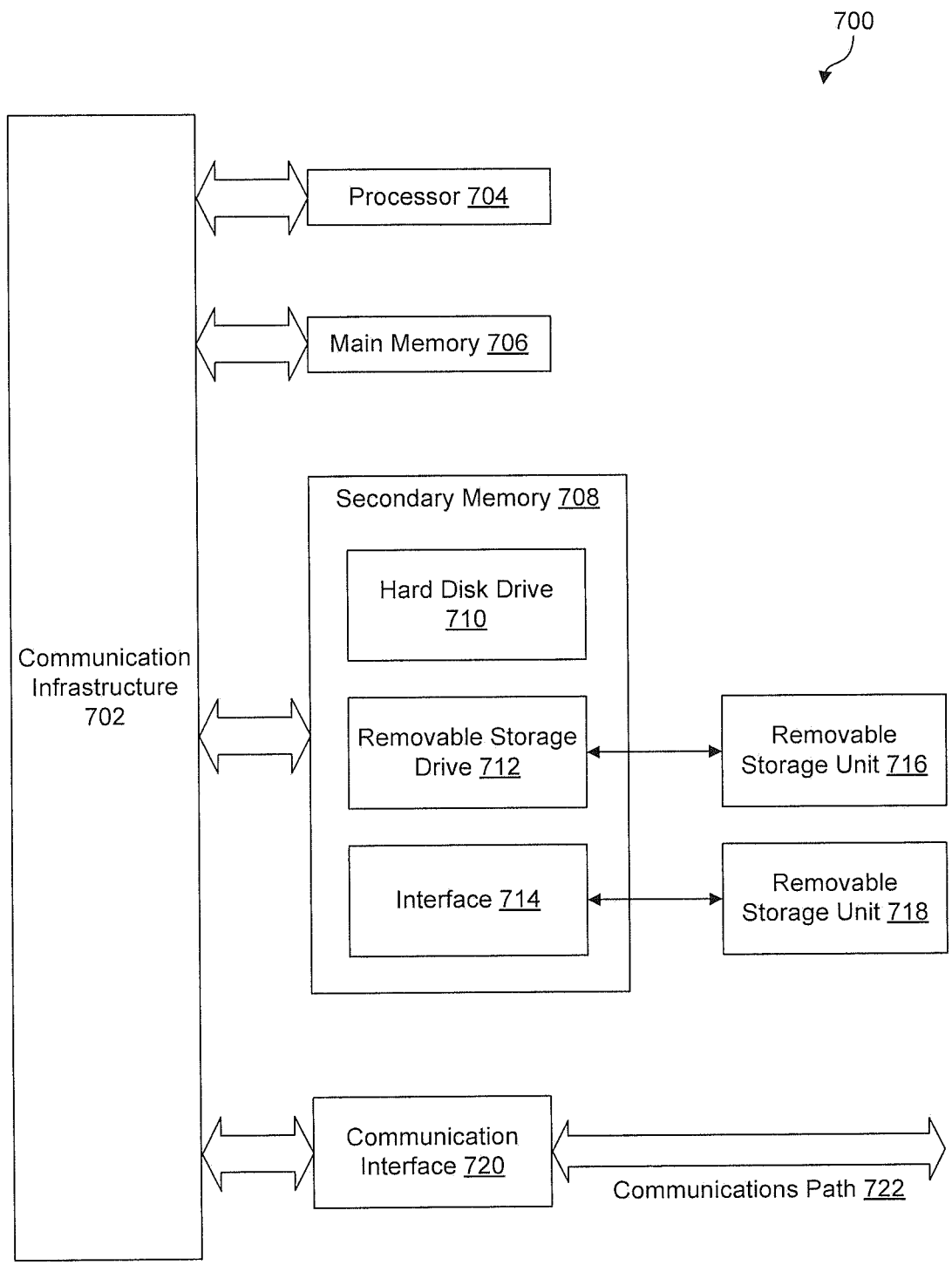
FIG. 7 illustrates a block diagram of an exemplary computer configuration according to an embodiment of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 5-6 can be implemented in the environment of one or more computer systems or other processing systems. An example of such a computer system 700 is shown in FIG. 7. One or more of the modules depicted in the previous figures can be at least partially implemented on one or more distinct computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCM-CIA slot and card, and the like. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. An integrated circuit chip comprising:
    feature bank circuitry that manages a plurality of functional features capable of being carried out by the integrated circuit chip, each of the plurality of functional features being disabled prior to installation of a configuration file to a flash memory;
    a central processing unit (CPU) configured to receive the configuration file from a production server, wherein the configuration file is encrypted; and
    trusted execution environment circuitry preprogrammed with a decryption key and configured to:
        decrypt, using the preprogrammed decryption key, the configuration file that is encrypted;
        re-encrypt the decrypted configuration file; and
        forward the re-encrypted configuration file to the CPU,
    wherein the CPU is further configured to install the re-encrytped configuration file to a flash memory to enable one or more of the plurality of functional features based on a session identifier and the installation of the configuration file, wherein the trusted execution environment circuitry is separate from the CPU.

2. The integrated circuit chip of claim 1, wherein the configuration file includes a listing of functional features to be enabled and an identification associated with an owner of the listed functional features.

3. The integrated circuit chip of claim 1, wherein the trusted execution environment circuitry is further configured to:
    generate a log file that includes the configuration file, a unique identifier of the integrated circuit chip, and a key associated with the trusted execution environment circuitry;
    encrypt the log file using a session identifier received from the CPU;
    forward the encrypted log file the CPU, and
    wherein the CPU is further configured to forward the encrypted log file to the production server.

4. The integrated circuit chip of claim 1, wherein the preprogrammed decryption key is pre-associated with a service provider associated with one or more of the plurality of functional features.

5. The integrated circuit chip of claim 4, wherein the trusted execution environment circuitry is preprogrammed with a plurality of decryption keys, each of the plurality of decryption keys being pre-associated with a corresponding service provider.

6. The integrated circuit chip of claim 1, wherein the preprogrammed decryption key is associated with a manufacturer of the integrated circuit chip.

7. A method comprising:
managing, by a feature bank of a device, a plurality of functional features capable of being carried out by the device, each of the plurality of functional features being in a default disabled state;
receiving, by a central processing unit (CPU) of the device, an encrypted configuration file from a server;
decrypting, by a trusted execution environment preprogrammed with a decryption key, the encrypted configuration file using the preprogrammed decryption key;
re-encrypting, by the trusted execution environment, the decrypted configuration file;
forwarding, by the trusted execution environment, the re-encrypted configuration file to the CPU; and
enabling, by the CPU, one or more of the plurality of functional features based on a session identifier and installation of the re-encrypted configuration file to a flash memory, wherein the trusted execution environment is logically or physically separated from the CPU.

8. The method of claim 7, wherein the configuration file includes a listing of functional features to be enabled and an identification associated with an owner of the listed functional features.

9. The method of claim 7, further comprising:
generating, by the trusted execution environment, a log file that includes the decrypted configuration file, a unique identifier of the device, and a key associated with the trusted execution environment; and
encrypting, by the trusted execution environment, the log file using the session identifier, the session identifier having been received from the CPU.

10. The method of claim 9, further comprising:
forwarding, by the trusted execution environment, the encrypted log file to the CPU; and
forwarding, by the CPU, encrypted log file to the server.

11. The method of claim 7, wherein the preprogrammed decryption key is pre-associated with a service provider corresponding to one or more of the plurality of functional features.

12. The method of claim 11, wherein the trusted execution environment is preprogrammed with a plurality of decryption keys, each of the plurality of decryption keys being pre-associated with a corresponding service provider.

13. The method of claim 7, wherein the preprogrammed decryption key is associated with a manufacturer of the device.

14. A non-transitory machine readable medium comprising instructions that, when executed by circuitry of a device, causes the circuitry to perform operations comprising:
managing, by a feature bank circuitry, a plurality of functional features capable of being carried out by the device, each of the plurality of functional features being in a default disabled state;
receiving, by a central processing unit (CPU), a configuration file from a server, the configuration file being encrypted;
decrypting, by a trusted execution environment circuitry that is preprogrammed with a decryption key associated with a service provider that is different from a manufacturer of the circuitry, the configuration file that is encrypted using the preprogrammed decryption key;
re-encrypting, by the trusted execution environment circuitry, the decrypted configuration file;
forwarding, by the trusted execution environment circuitry, the re-encrypted configuration file to the CPU; and
enabling, by the CPU, one or more of the plurality of functional features based on a session identifier and installation of the re-encrytped configuration file to a flash memory, wherein the trusted execution environment circuitry is separate from the CPU.

15. The non-transitory machine readable medium of claim 14, wherein the configuration file includes a listing of functional features to be enabled and an identification associated with an owner of the listed functional features.

16. The non-transitory machine readable medium of claim 14, wherein the operations further comprise:
generating, by the trusted execution environment, a log file that includes the configuration file, a unique identifier of the device, and a key associated with the trusted execution environment; and
encrypting, by the trusted execution environment circuitry, the log file using a session identifier received from the CPU.

17. The non-transitory machine readable medium of claim 16, wherein the operations further comprise:
forwarding, by the trusted execution environment circuitry, the encrypted log file to the CPU; and
forwarding, by the CPU, the encrypted log file to the server.

18. The non-transitory machine readable medium of claim 14, wherein the preprogrammed decryption key is associated with a service provider associated with one or more of the plurality of functional features.

19. The non-transitory machine readable medium of claim 18, wherein the trusted execution environment circuitry is preprogrammed with a plurality of decryption keys, each of the plurality of decryption keys being associated with a corresponding service provider.

* * * * *